United States Patent
Burroughs et al.

(10) Patent No.: US 8,539,199 B2
(45) Date of Patent: Sep. 17, 2013

(54) HASH PROCESSING IN A NETWORK COMMUNICATIONS PROCESSOR ARCHITECTURE

(75) Inventors: William Burroughs, Macungie, PA (US); Deepak Mital, Orefield, PA (US); Mohammed Reza Hakami, Bethlehem, PA (US); Michael R. Betker, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 319 days.

(21) Appl. No.: 13/046,717

(22) Filed: Mar. 12, 2011

(65) Prior Publication Data
US 2011/0225391 A1   Sep. 15, 2011

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/313,399, filed on Mar. 12, 2010, provisional application No. 61/313,219, filed on Mar. 12, 2010, provisional application No. 61/313,189, filed on Mar. 12, 2010.

(51) Int. Cl.
G06F 12/08   (2006.01)

(52) U.S. Cl.
USPC ........................... 711/216; 707/747

(58) Field of Classification Search
None
See application file for complete search history.

(56) References Cited

U.S. PATENT DOCUMENTS

| | | |
|---|---|---|
| 4,622,631 A | 11/1986 | Frank et al. |
| 5,623,698 A | 4/1997 | Stephenson et al. |
| 5,892,766 A | 4/1999 | Wicki et al. |
| 5,943,283 A | 8/1999 | Wong et al. |
| 5,974,421 A | 10/1999 | Krishnaswamy et al. |
| 6,038,630 A | 3/2000 | Foster et al. |
| 6,052,697 A | 4/2000 | Bennett et al. |
| 6,195,335 B1 | 2/2001 | Calvignac et al. |
| 6,567,564 B1 | 5/2003 | van der Wal |
| 6,636,932 B1 | 10/2003 | Regev et al. |
| 7,031,985 B1 * | 4/2006 | Pecheny .................................. 1/1 |
| 7,085,911 B2 | 8/2006 | Sachedina et al. |
| 7,089,346 B2 | 8/2006 | Cebulla et al. |
| 7,234,018 B1 | 6/2007 | Purcell et al. |
| 7,302,542 B1 * | 11/2007 | Cantrill .......................... 711/170 |
| 7,461,208 B1 | 12/2008 | Caprioli et al. |
| 7,596,142 B1 | 9/2009 | MacAdam |

(Continued)

*Primary Examiner* — Kaushikkumar Patel

(57) ABSTRACT

Described embodiments provide a hash processor for a system having multiple processing modules and a shared memory. The hash processor includes a descriptor table with N entries, each entry corresponding to a hash table of the hash processor. A direct mapped table in the shared memory includes at least one memory block including N hash buckets. The direct mapped table includes a predetermined number of hash buckets for each hash table. Each hash bucket includes one or more hash key and value pairs, and a link value. Memory blocks in the shared memory include dynamic hash buckets available for allocation to a hash table. A dynamic hash bucket is allocated to a hash table when the hash buckets in the direct mapped table are filled beyond a threshold. The link value in the hash bucket is set to the address of the dynamic hash bucket allocated to the hash table.

20 Claims, 8 Drawing Sheets

(56) References Cited

U.S. PATENT DOCUMENTS

| | | |
|---|---|---|
| 7,809,701 B2 * | 10/2010 | Blake ............................ 707/698 |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0085554 A1 * | 4/2006 | Shah et al. .................... 709/235 |
| 2006/0095910 A1 * | 5/2006 | Norton et al. ................. 718/100 |
| 2006/0256783 A1 | 11/2006 | Ayrapetian et al. |
| 2007/0016756 A1 | 1/2007 | Hsieh et al. |
| 2007/0226798 A1 | 9/2007 | Sibert |
| 2008/0021908 A1 * | 1/2008 | Trask et al. .................... 707/100 |
| 2008/0162793 A1 | 7/2008 | Chu et al. |
| 2009/0100055 A1 * | 4/2009 | Wang ................................ 707/6 |
| 2010/0257181 A1 * | 10/2010 | Zhou et al. ..................... 707/747 |
| 2010/0260198 A1 | 10/2010 | Rojas-Cessa et al. |
| 2012/0036134 A1 * | 2/2012 | Malakhov ..................... 707/747 |

\* cited by examiner

1000

HASH PROCESSING IN A NETWORK COMMUNICATIONS PROCESSOR ARCHITECTURE

CROSS-REFERENCE TO RELATED APPLICATIONS

This application claims the benefit of the filing date of U.S. provisional application Nos. 61/313,399, 61/313,219 and 61/313,189, all filed Mar. 12, 2010, the teachings of which are incorporated herein in their entireties by reference.

This application is a continuation-in-part, and claims the benefit of the filing date, of U.S. patent application Ser. Nos. 12/782,379 filed May 18, 2010, 12/782,393 filed May 18, 2010, and 12/782,411 filed May 18, 2010, the teachings of which are incorporated herein in their entireties by reference.

The subject matter of this application is related to U.S. patent application Ser. Nos. 12/430,438 filed Apr. 27, 2009, 12/729,226 filed Mar. 22, 2010, 12/729,231 filed Mar. 22, 2010, 12/963,895 filed Dec. 9, 2010, 12/971,742 filed Dec. 17, 2010, 12/974,477 filed Dec. 21, 2010, 12/975,823 filed Dec. 22, 2010, 12/975,880 filed Dec. 22, 2010, 12/976,045 filed Dec. 22, 2010, 12/976,228 filed Dec. 22, 2010, and 13/046,719 filed Mar. 12, 2011, the teachings of which are incorporated herein in their entireties by reference.

BACKGROUND OF THE INVENTION

1. Field of the Invention

The present invention relates to communication systems, in particular, to hash processing in an accelerated processor architecture for network communications.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators.

Network processors implemented as a system on chip (SoC) having multiple processing modules might typically classify an incoming packet to determine which of the processing modules will perform operations for the particular packet or flow of packets. Typical packet classification algorithms might perform a hashing operation on a portion of the packet data to determine a flow identifier of the packet. The hash value might be employed as an index into a lookup table storing identifiers of the various flows that are active within the network processor. In a typical network processor, millions of flows might be active at a given time and the storage requirements for the lookup table can become large.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a hash processor for a system having multiple processing modules and a shared memory. The hash processor includes a descriptor table with N entries, each entry corresponding to a hash table of the hash processor. A direct mapped table in the shared memory includes at least one memory block including N hash buckets. The direct mapped table includes a predetermined number of hash buckets for each hash table. Each hash bucket includes one or more hash key and value pairs, and a link value. Memory blocks in the shared memory include dynamic hash buckets available for allocation to a hash table. A dynamic hash bucket is allocated to a hash table when the hash buckets in the direct mapped table are filled beyond a threshold. The link value in the hash bucket is set to the address of the dynamic hash bucket allocated to the hash table.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Described embodiments of the present invention provide a hash processor for a system having multiple processing modules and a shared memory. The hash processor includes a descriptor table with N entries, each entry corresponding to a hash table of the hash processor. A direct mapped table in the shared memory includes at least one memory block including N hash buckets. The direct mapped table includes a predetermined number of hash buckets for each hash table. Each hash bucket includes one or more hash key and value pairs, and a link value. Memory blocks in the shared memory include dynamic hash buckets available for allocation to a hash table. A dynamic hash bucket is allocated to a hash table when the hash buckets in the direct mapped table are filled beyond a threshold. The link value in the hash bucket is set to the address of the dynamic hash bucket allocated to the hash table.

Table 1 defines a list of acronyms employed throughout this specification as an aid to understanding the described embodiments of the present invention:

TABLE 1

| USB | Universal Serial Bus | FIFO | First-In, First-Out |
| --- | --- | --- | --- |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | μP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| IP | Internet Protocol | CRC | Cyclic Redundancy Check |

Figure 1:
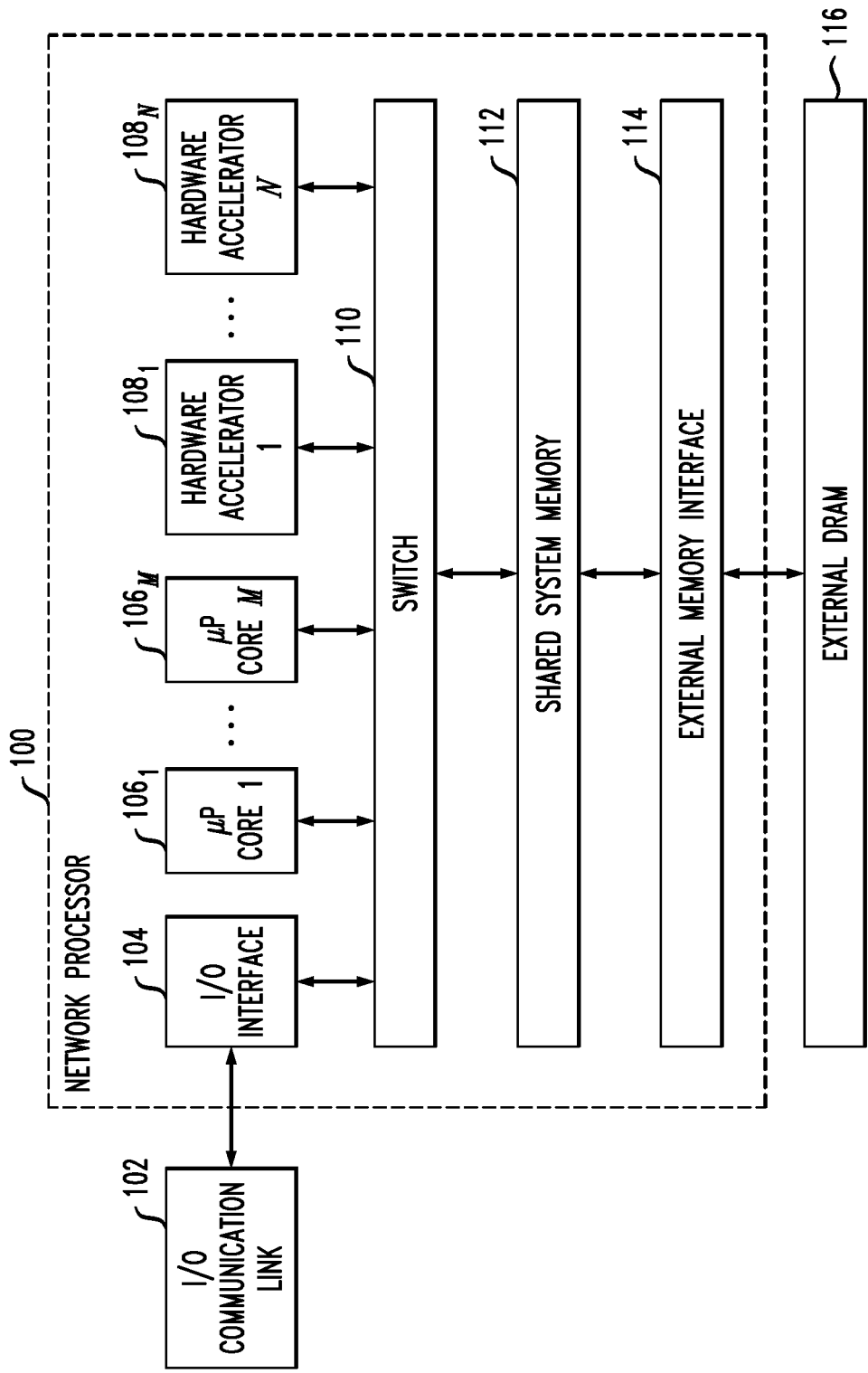
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. Nos. 12/430,438 filed Apr. 27, 2009, 12/729,226 filed Mar. 22, 2010, and 12/729,231 filed Mar. 22, 2010.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to external memory 116 to provide off-chip storage of data not needed by the various μP cores 106 and hardware accelerators 108 to free space in shared memory 112. The μP cores and hardware accelerators might interact with each other as described in related U.S. patent application Ser. Nos. 12/782,379, 12/782,393, and 12/782,411, all filed May 18, 2010, for example, by one or more communication bus rings that pass "tasks" from a source core to a destination core. As described herein, tasks are instructions to the destination core to perform certain functions, and a task might contain address pointers to data stored in shared memory 112.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably received for a task and transmitted externally. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 and hardware accelerators 108 might include, for example, a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED becomes the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,439,652 or U.S. Patent Application Publication No. 2008/0270342, both of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove the need for replicating the data each time the data is needed. The MMB preferably tracks the memory allocations using a stack-based approach since a memory block recently released is preferably the next block to be allocated for a particular task, reducing cache trashing and cache tracking overhead. The MMB might operate substantially as described in related U.S. patent application Ser. No. 12/963,895.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. Nos. 12/974,477, 12/975,823, 12/975,880, 12/976,045, and 12/976,228. The MPP might also include hash functionality as described in greater detail herein.

Figure 2:
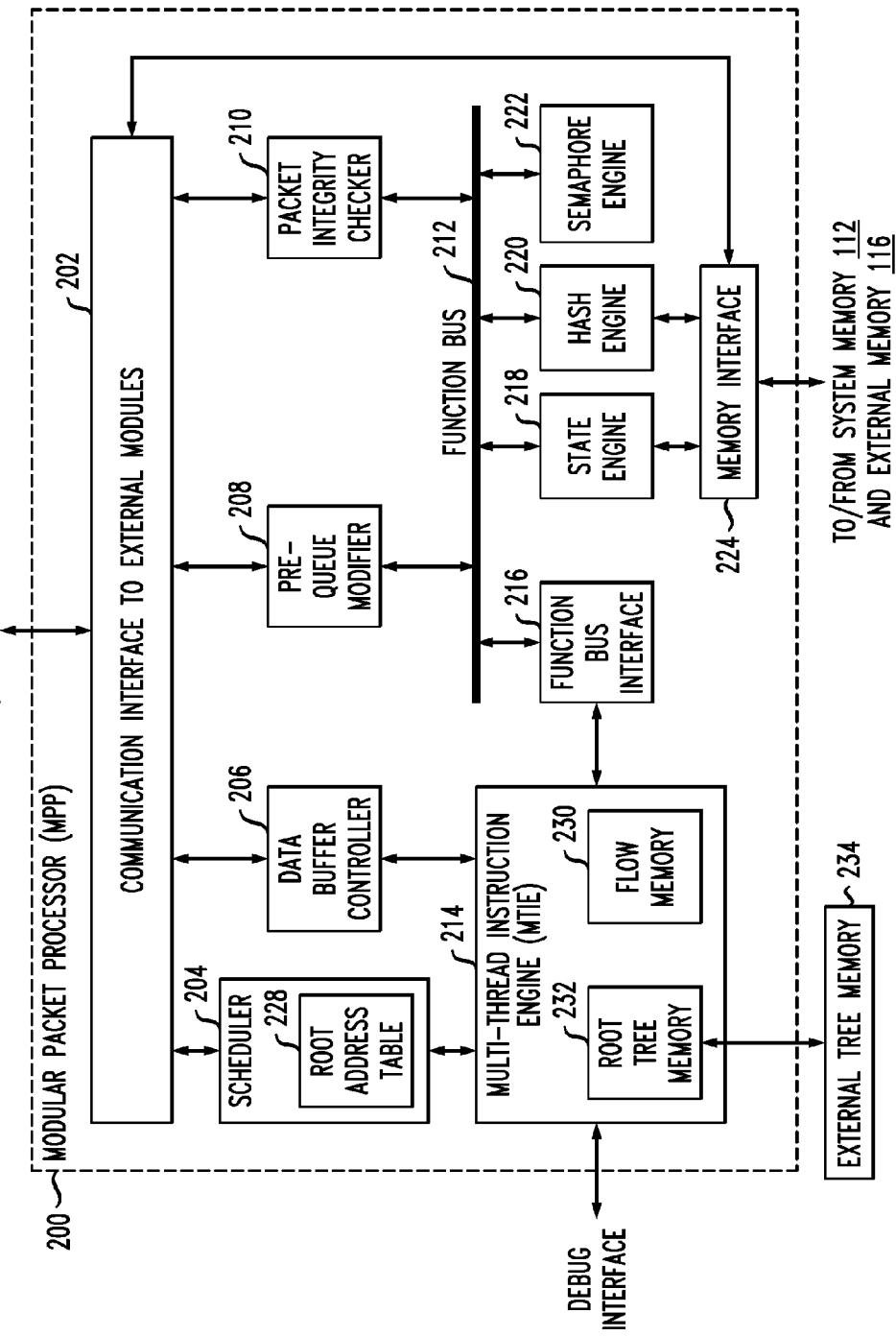
FIG. 2 shows a block diagram of a modular packet processor submodule of the network processor of FIG. 1.

FIG. 2 shows a block diagram of an exemplary MPP 200, in accordance with embodiments of the present invention. MPP 200 might receive an input task from any μP core or accelerator (e.g., μP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another μP core or accelerator of network processor 100, for example, a next μP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

As shown in FIG. 2, and as will be described, packet classification might be performed by Multi-thread Instruction Engine (MTIE) 214 of MPP 200. Packet (also Protocol Data Unit or PDU) data modification might be carried out by Pre-Queue Modifier (PQM) 208. A packet integrity check might typically be carried out by Packet Integrity Checker (PIC) 210, such as determining that a packet is properly formed according to a given protocol. PIC 210 might, for example, implement various CRC and checksum functions of MPP 200. Interface to communication interface 202 might provide a standard interface between MPP 200 and chip level connections to external modules of network processor 100, for example by one or more ring communication buses.

Semaphore Engine (SEM) 222 implements semaphore logic in MPP 200, and might support up to 1024 logical semaphores, which might correspond to 4 physical semaphores, each corresponding to 256 logical semaphores. Semaphores are used to manage atomic access to a hardware resource of network processor 100 and MPP 200. For example, for a context thread to utilize an instance of a hardware resource, the context thread might have to reserve a semaphore for that resource. A context might be allowed to have up to 4 outstanding physical semaphores. Semaphores are allocated and released by SEM 222 based on function calls received by function bus 212. SEM 222 might support ordered and unordered semaphore calls.

State Engine (SENG) 218 might perform functions of a finite state machine (FSM) that operates on received packets. For example, SENG 218 might perform statistics counts and run traffic shaper scripts. SENG 218 might store statistics data in system memory 112, via memory interface 224, and might employ a data cache to reduce accesses to system memory 112 when there are multiple accesses to the same location of system memory.

MPP 200 might generally be implemented as a multi-threaded engine capable of executing parallel functions. The multi-threading operation is performed by multiple contexts in MTIE 214. Some embodiments of MPP 200 might employ more than one MTIE 214 to support additional context processing. For example, MPP 200 might preferably include 4 MTIE cores, each capable of processing 32 contexts, for a total of 128 contexts. These contexts might be supported by 256 task identifiers (TIDs), meaning that contexts for up to 256 tasks might be concurrently active in MPP 200.

MPP 200 might typically receive input tasks via a task ring such as described in U.S. patent application Ser. No. 12/782, 379 filed May 18, 2010. Additionally, MPP 200 might receive a timer event via a timer ring. Receiving a task or receiving a timer event results in a context being generated in MPP 200 corresponding to the received task or timer event. Upon receiving a task, MPP 200 reads the task from system memory 112, for example via communication interface 202 and memory interface 224. Communication interface 202 issues a task start request to MTIE core 214 via scheduler (SCH) 204. A typical task might include 32 bytes of parameter data, and a typical timer event might include 13 bytes of parameter data.

SCH 204 tracks MPP contexts and maintains a list of free contexts. Upon receiving a task start request, if a free context is available, SCH 204 issues a context start indication to one or more other modules of MPP 200 such that the various modules, if necessary, might initialize themselves to process the context. SCH 204 also maintains task template to root address table 228. Root address table 228 specifies the instruction entry point (e.g., the address of first instruction in flow memory 230) for a given task template. Root address table 228 might typically be loaded on initial configuration of MPP 200.

Upon receiving the context start indication from SCH 204, MTIE 214 initializes its internal context memory and loads the task parameters of the received task. MTIE 214 also loads the root address to use for the context from root address table 228, such that MTIE 214 can determine what processing to perform for the received input task. Upon receiving the context start indication from SCH 204, Data Buffer Controller 206 initiates a data read operation to read the packet data corresponding to the context from at least one of system memory 112 and external memory 116. HE 220, FBI 216 and PIC 210 reset various valid bits for error detection for the context.

After the context start indication is issued, SCH 204 issues a context schedule indication to MTIE 214. In response to the context schedule indication, MTIE 214 starts executing a first command stored at the location specified in root address table 228. The command might be stored in at least one of root tree memory 232, flow memory 230, and external tree memory 234. While executing the specified commands, MTIE 214 fetches tree instructions from either root tree memory 232 or external tree memory 234. MTIE 214 also fetches flow instructions from flow memory 230. Some embodiments might include a 16 KB flow memory for each MTIE core of MPP 200, and some embodiments might further allow the flow memory for multiple MTIE cores to be shared to increase the size of the flow memory for all MTIE cores.

Upon reaching a point in context processing that requires processing by a module of MPP 200 external to MTIE 214, MTIE 214 sends the context along with the corresponding function call and arguments to FBI 216. Once the context is delivered to FBI 216, the context might become inactive in MTIE 214 because, in general, a given context might only be active in one module of MPP 200 at any one time. FBI 216 provides the function call to the designated unit for execution via function bus 212. Although function bus 212 is shown in FIG. 2 as a single bus, some embodiments might employ more than one function bus 212, based on the type of module that is coupled to each bus. In general, function bus 212 might be employed to communicate between MTIE 214 and HE 220, PIC 210, SEM 222, PQM 208 and SENG 218.

Data Buffer Controller (DBC) 206 might implement the data buffer function. DBC 206 fetches PDU data for MTIE 214 from memory external to MPP 200 (e.g., one of system memory 112 or external memory 116). DBC 206 might issue a read indication signal and a read done indication signal to FBI 216 to schedule the read requests. DBC 206 might have up to 2 read requests pending at any time for a given context. FBI 216 might prevent context termination if DBC 206 has pending reads for the context.

For functions that are defined as ordered, FBI 216 sends out function calls in the order in which the contexts are started in MPP 200. For functions that are not defined as ordered, FBI 216 might send out function calls in the order they are received by FBI 216. FBI 216 might typically queue contexts so that generally newer contexts wait for the generally oldest context to be executed. FBI 216 also determines the routing of each function call to a destination module and determines whether the function returns any data upon completion. If a function call does not return data, then FBI 216 sends the context to SCH 204 when the destination module returns an indication that it has started processing the function call. If the function call does return data, then FBI 216 sends the context to SCH 204 after the data is returned to FBI 216 by the destination module. Upon receiving the data, FBI 216 sends the data to MTIE 214, and MTIE 214 writes the data to an internal memory (not shown). Once the returned data is written to memory, the context is provided to SCH 204. Additionally, FBI 216 might determine if a function call is a "terminating" function call that ends context processing by MPP 200. Terminating function calls might typically be issued by Pre-Queue Modifier 208 directly to SCH 204. When a terminating function call is processed, MPP 200 generates an output task that is communicated, for example, over a ring communication bus to a next module of network processor 100 for subsequent processing after MPP 200.

MPP 200 might track a virtual flow identifier (vflow ID) and an index (vflow Index) with each output task, indicative of what one(s) of cores 106 or accelerators 108 operate on a data packet after MPP 200 has finished its processing. Communication interface 202 generates an output task based on the vflow ID and vflow Index and the output task is transmitted, for example via a task ring, to the subsequent destination module. An input task might result in the generation of multiple output tasks. As described herein, MPP 200 maintains task order between input and output, such that output tasks are generated in the order in which the input tasks are received by MPP 200, and thus also the order in which the corresponding contexts are started in MPP 200.

SCH 204 starts a new context when new tasks are received by MPP 200. SCH 204 receives a Task ID (TID) that identifies the received task and starts a context by allocating a context number to associate with that task. The TID and context number might be passed on to other modules of MPP 200 when the context is started. A context is associated with this TID and context number until SCH 204 receives an indication that processing of the context is terminated. In general, a new context is started for a received task if the following conditions are true: (1) there are available contexts; and (2) a Task Start FIFO buffer has enough available entries for at least one complete task. To start a new context, SCH 204 reads task information from one or more Task Start FIFO buffer locations. The Task Start FIFO buffers might be FIFO buffers stored in an internal memory of SCH 204. SCH 204 starts a context by allocating a new context number and setting a status bit of the context, indicating that this context is ready to be scheduled. SCH 204 stores the task information in a Per-Context Memory (PCM) of SCH 204. The PCM might be addressed by context number. In some embodiments, the PCM is implemented as a two-port memory with one port dedicated to write context information, and one port dedicated to read context information. The context information might also be provided to other modules of MPP 200 when the context is started, allowing the modules to initialize any per-context memories for the new context.

SCH 204 might maintain a Classification Completion List (CCL) such as described in related U.S. patent application Ser. No. 12/975,880. The CCL stores pointers to the contexts and control data, such as context start order, context number, and thread identifiers (THID), for each context. When a new terminating function is issued by PQM 208 to SCH 204, the terminating function is appended to the CCL after any older CCL entries for the corresponding context. The next newest context, for example the next context in the CCL linked list, is then started. When a context becomes the oldest context in MPP 200, SCH 204 reads the CCL contents and sends them to PQM 208 to form instructions to communication interface 202 to generate a corresponding output task that is, for example, based on a vflow ID, a vflow Index, and the actual packet data. SCH 204 might determine which context is the oldest if the context is the head entry of the CCL linked list. Alternatively, if SCH 204 employs more than one output queue, a CCL linked list might exist for each output queue, and, thus, SCH 204 might select the oldest context from one of the output queues, and sends that context to PQM 208. Since an ordering requirement between OQs is not necessary, any non-empty OQ might be selected (for example, using a round robin algorithm) to begin transmission.

The CCL location is freed for another context and the output task is sent to the next destination module of network processor 100. When a context is terminated, that context is not reallocated until all other modules of MPP 200 have acknowledged to SCH 204 that they are done processing the context. Thus, as described herein, SCH 204 provides context start and context complete information to other modules of MPP 200, and provides context scheduling information to MTIE 214. As will be described, MTIE 214 might also provide instruction breakpoint information to SCH 204.

In situations where one or more system resources are running low, SCH 204 might stop scheduling contexts that consume the resources. Thus, SCH 204 might place a context in a "parked mode". While a context is parked, SCH 204 will not schedule it to MTIE 214. SCH 204 might place a context in parked mode for any of the following cases. For case (1), the context is placed in a parked mode when free locations in the Classification Completion List (CCL) are below a minimum threshold, thus becoming at risk of not being able to satisfy all active contexts. In this condition, any context that allocates a new CCL location, and is not a terminating function, is parked by SCH 204. A context parked for this reason remains parked until free locations in the CCL are above the minimum threshold. For case (2), the context is placed in a parked mode when PQM 208 instruction memory is below a minimum threshold and at risk of not being able to satisfy all the active contexts. In this condition, any context that uses PQM instruction memory is parked by SCH 204. A context parked for this reason remains parked until free PQM instruction memory is above the minimum threshold. In some embodiments, contexts parked for either cases (1) or (2) might remain parked until the tests for both cases (1) and (2) are satisfied, for example, that free locations in the CCL are above the minimum threshold and free PQM instruction memory is above the minimum threshold. For case (3), the context is placed in a parked mode when SCH 204 parks a context due to an instruction breakpoint, which might be performed for diagnostic purposes. Thus, a context might be parked due to system resources being below a minimum (e.g., one or both of free locations in the CCL and free PQM instruction memory) or a context might be parked because of an instruction breakpoint. The instruction breakpoint might function as described in related U.S. patent application Ser. No. 12/976,045.

MTIE 214 includes flow memory 230. Flow memory 230 might be 24 bits wide and 16 KB in size. The first (e.g., lowest addressed) flow instructions might be stored in the flow instruction cache of flow memory 230, while subsequent instructions (e.g., higher addressed flow instructions) might be mapped by a base register of MTIE 214 and stored in external tree memory 234. In exemplary embodiments, MPP 200 might include 1, 2, 4, 6 or 8 MTIE cores. In embodiments with multiple MTIE cores, the flow memory of one or more cores might be joined together to increase the flow memory size for the overall group of MTIE cores. In general, flow memory 230 might have a lower read latency versus external tree memory 234.

MTIE 214 includes root tree memory 232. Root tree memory 232 might include 1K of memory and might contain the first 1024 tree instructions for zero latency instruction access. In general, root tree memory 232 might have a lower read latency versus external tree memory 234. To improve the read latency of external tree memory 234, data might be duplicated across one or more locations of external tree memory 234. For example, as described in related U.S. patent application Ser. No. 12/975,823, one logical address might be mapped to one or more physical addresses in external tree memory 234. The contents of the tree memory might be duplicated across one or more physical memory banks of external tree memory 234 to reduce memory contention for frequently accessed instructions.

In general, MPP 200 might perform hash functions to classify packets received by network processor 100, and to identify a flow corresponding to a given packet. Hash table operations might be carried out by Hash Engine (HE) 220. HE 220 implements hash engine functionality in MPP 200. HE 220 receives hash operation requests from Function Bus Interface (FBI) 216 over function bus 212. HE 220 might generally execute the hash operation requests in the order in which it receives them on the function bus. Hash tables employed by HE 220 are stored in system memory 112, via memory interface 224. Embodiments of HE 220 might implement up to 1024 independent hash tables. Each hash table might be allocated dedicated static memory at system startup of network processor 100, but might also be dynamically allocated additional memory over time as network processor 100 operates. In some embodiments, additional memory is allocated dynamically to a hash table in 256B blocks.

As shown in FIG. 2, HE 220 is coupled to MTIE 214 through FBI 212. HE 220 incorporates one or more hash tables for key-based operations. HE 220 might perform various hash table operations such as searching a hash table for a key match and returning an associated value, inserting a new entry value, updating an existing value, or deleting an existing value. HE 220 might operate independently of other processing modules of network processor 100. As will be described, each hash operation request might include an index value and a key value. The index value corresponds to a given hash table, and the key value is used to find the potential matching key in the corresponding hash table. Each hash table includes one or more multi-entry buckets, with each entry including a value and a key. Each bucket also has a link which points to a next bucket in the search linked list.

Figure 3:
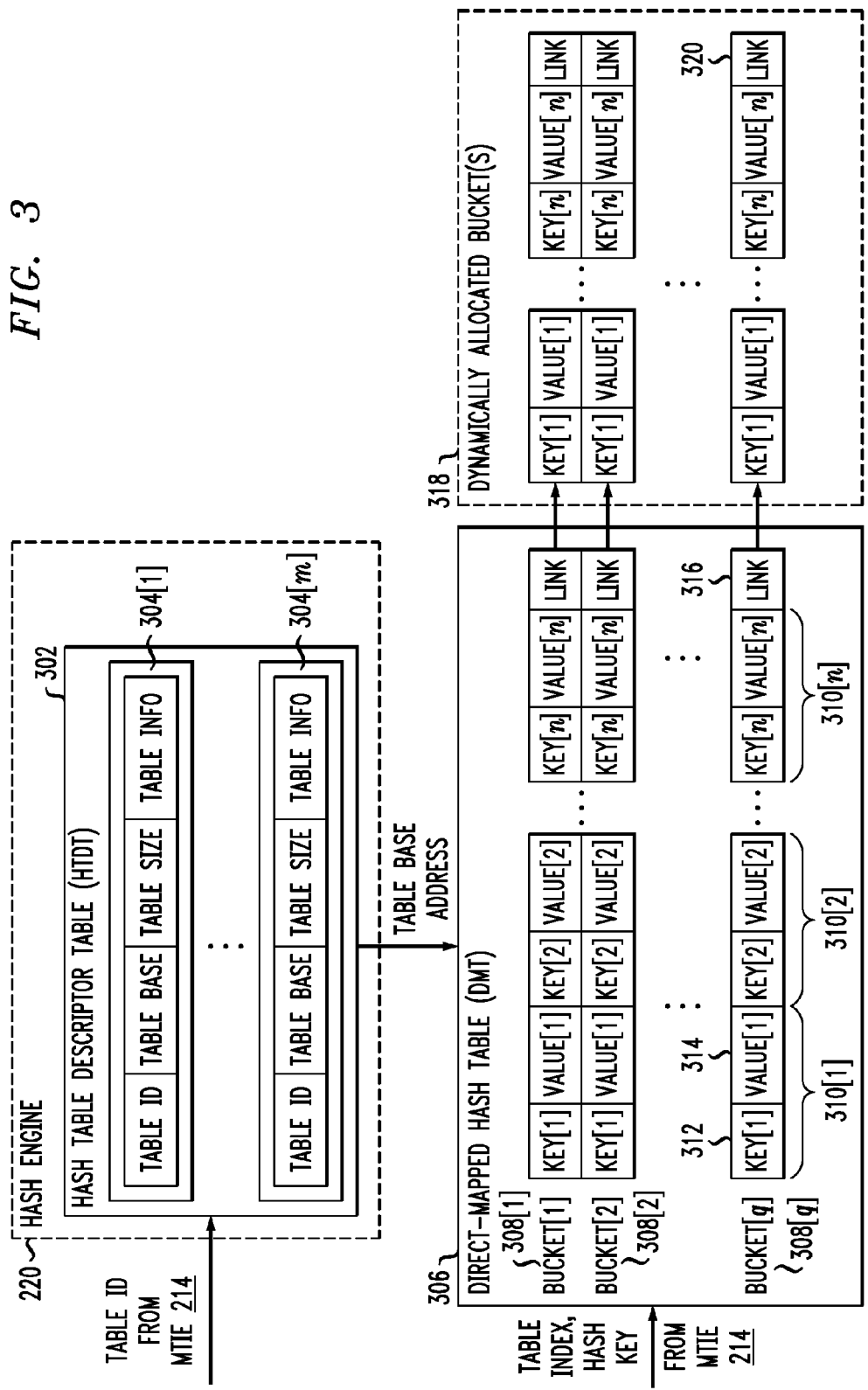
FIG. 3 shows an exemplary block diagram of various data structures of a hash engine of the modular packet processor of FIG. 2.

MTIE 214 might generate a hash key and a hash table search entry point ("table index") to search a given hash table. MTIE 214 might also generate a table identifier ("tableID") to identify a particular hash table to search. As shown in FIG. 3, HE 220 might use the tableID as an index into an embedded Hash Table Descriptor Table (HTDT) 302 to determine a corresponding table ID, table base address, table size, a maximum number of memory blocks that might be dynamically allocated for this table by the MMB, and other data, shown as HTDT entries 304[1]-304[m]. Each HTDT entry 304[1]-304[m] maps to a corresponding Direct-Mapped hash Table (DMT) of HE 220, shown as DMT 306. DMT 306 is statically allocated by the MMB for use by HE 220 at startup of network processor 100.

DMT 306 might include a number of "buckets", shown as buckets 308[1]-308[q], where each bucket is the hash table search entry point corresponding to the table index value generated by MTIE 214 and stored in a corresponding one of HTDT entries 304[1]-304[m]. In some embodiments of the present invention, each bucket might be 64 bytes long. As shown in FIG. 3, each bucket 308[1]-308[q] might contain up to n entries, shown as 310[1]-310[n]. In some embodiments of the present invention, each bucket might contain four table entries (e.g., n=4). Each entry 310[1]-310[n] might typically contain: (i) a key value, 312, that is compared to the hash key generated by MTIE 214, and (ii) a data value, 314, that might include various data, such as (timer & data, name, timer & name). Each entry 310[1]-310[n] might also include an entry valid indicator (not shown) that indicates the corresponding entry contains valid key and result data. Each bucket 308[1]-308[q] might include a link entry, 316, that includes an address of a subsequently allocated bucket, shown as 318.

As described herein, HE 220 might typically be associated with one or more hash tables stored in at least one of system memory 112 and external memory 116. The access time to the hash tables might be affected by the hash table structure and organization, which in turn might affect the performance of MPP 200 and network processor 100. As will be described, embodiments of the present invention might statically allocate one or more base memory blocks to store each hash table. As more entries are added to a given hash table, additional memory blocks might be dynamically allocated for the hash table, for example by the MMB.

As shown in FIG. 3, a hash table is an array of {Key, Result} entries in one or more buckets, for example shown as hash buckets 308[1]-308[q], addressed by a table index that is computed by a hash-function employing a hash key. Common hash table operations include (1) inserting an entry into the hash table, (2) looking up an entry in the hash table and (3) deleting an entry from the hash table. Each entry in the hash table, shown as entries 310[1]-310[n], includes an entry value, shown as value 314, that is identified by an associated hash key, shown as key 312. An entry is inserted into the table by mapping a hash key to a table index within HTDT 302.

Multiple hash keys might map to one hash table index. In embodiments of the present invention, a uniform hashing-function is employed to more uniformly distribute hash key associations among the table indices. The number of hash keys mapped to a given table index might be determined by a probability distribution given the total number of table indices and the number of entries the hash table. The number of entries in the table varies over time based on factors such as network traffic. Embodiments of DMT 306 might be sized so as to beneficially have a low-probability of having a large linked-list for any given hash table to reduce the lengths of hash tables to be searched, and thus reduce hash table search times.

The time to insert a new entry, or to find an existing entry, in a hash table is related to the number of hash keys mapped to each table index. To beneficially reduce the response time of hash table search operations, described embodiments provide a hash table data structure that incorporates (i) static hash table memory allocation that is efficient for systems having a small number of hash keys mapped to a table index, and (ii) dynamic hash table memory allocation for systems having low-probability, large linked-lists of hash results. Described embodiments thus reduce hash table search-time by employing static and dynamic hash table memory allocation in a cache-based hash processing system.

Described embodiments might implement a system cache within shared memory 112, where the system cache has memory blocks available for use by the various processing modules of network processor 100. Exemplary embodiments might employ one or more memory block sizes, each memory block having a cache line length of, for example, 256 bytes. For described embodiments employing a cache line size of 256B, each cache line might store up to 16 hash entries can be searched and potentially modified in one cache line. Thus, to search 16 entries, only one main-memory access might be needed, resulting in an improvement by a factor of 16 in reduction of accesses to shared memory 112.

Typical operation requests to hash engine 220 might include "insert", "lookup" and "delete" operations. A typical operation request might include a table ID value that indicates which hash table is to be searched, a table index value that determines a point of entry to the hash table, a key value that is compared against entries in the hash table starting at the table index and going until a match is found or until the hash table is exhausted. As shown in FIG. 3, Hash Table Descriptor Table (HTDT) 302 stores the size, shape and bucket data for each hash table (table ID) of HE 220. HTDT 302 stores definitions of the boundaries of each hash table.

Each hash table listed in HTDT 302 corresponds to at least one bucket within Direct-Mapped hash Table (DMT) 306. DMT 306 provides a "starting point" for a hash table search that is constructed from a linked list of one or more statically allocated buckets, shown as buckets 308[1]-308[q], and potentially one or more dynamically allocated buckets, shown as dynamically allocated buckets 318. As described herein, the various statically allocated and dynamically allocated buckets might be stored in shared memory 112.

As shown in FIG. 3, each bucket in DMT 306 includes a link, shown as link 316. Link 316 provides a pointer to a next bucket in a search linked list for a given hash table. As new dynamic buckets 318 are allocated to a given hash table, link 320 at the end of the search linked list is updated to point to the newly allocated bucket. As shown in FIG. 3, each bucket 308[1]-308[q] includes one or more entries 310[1]-310[n]. Each entry 310 of a given bucket includes a corresponding hash key 312 and value 314. Each bucket 308 also includes link 316 that links to a next bucket in the search linked list for each hash table.

Figure 7:
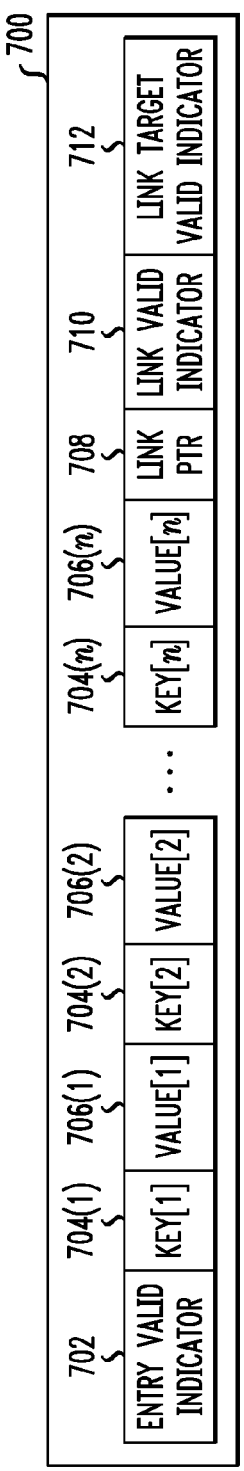
FIG. 7 shows an exemplary block diagram of a hash table data structure of a hash engine of the modular packet processor of FIG. 2.

Although not shown in FIG. 3, link 316 might include one or more control indicators, for example a link valid indicator and a link target valid indicator. The link valid indicator might indicate whether link 316 points to an allocated bucket in shared memory 112. The link target valid indicator might be set once data is written into the next bucket corresponding to link 316. FIG. 7 shows an exemplary data structure for a hash table bucket 700. As shown in FIG. 7, each bucket might include up to n key and value pairs, shown as keys 704(1)-704(n) and values 706(1)-706(n). Link pointer 708 might include an address of a next bucket in the hash table, for example an address for a memory location in shared memory 112. Link valid indicator 710 indicates whether link pointer 708 points to an allocated bucket in shared memory 112. Link target valid indicator 712 indicates that data is written into the next bucket corresponding to link pointer 708. In some embodiments, n is equal to 4 and each bucket is 64 bytes, where keys 704(1)-704(n) are 8-byte values, values 706(1)-706(n) are 7-byte values, link pointer 708 is a 30-bit value, link valid indicator 710 is a 1-bit flag, and link target valid indicator 712 is a 1-bit flag.

There is at least one bucket in DMT 306 corresponding to each hash table of HE 220. In some embodiments, HE 220 might support up to 1024 hash tables. As shown, DMT 306 includes an array of buckets 308[1]-308[n]. DMT 306 is accessed based on fields stored in HTDT 302, such as the table base and table size fields. The table base value corresponds to the address of the first bucket in the search list for a given hash table. If one of the entries 310[1]-310[n] in the bucket corresponding to the table base value matches the hash key, no additional searching is required. If a match is not found in the bucket corresponding to the table base value, and the bucket corresponding to the table base value has one or more additional buckets linked to it, for example if the link target indicator is set, the search continues through a search linked list of buckets based on link value 316.

The size of the buckets might be a function of the memory access pattern of HE 220 to shared memory 112, the cache line size of network processor 100 and the memory block size of shared memory 112. For example, matching the dynamic block size to the cache line size might beneficially provide similar access times for both statically allocated buckets and dynamically allocated buckets. In some embodiments, each DMT region maps to one cache line, which beneficially allows the DMT for a given hash table might be transferred to the cache and HE 220 in a single access of shared memory 112. In some described embodiments, the cache line size is 256B and a memory transfer pattern of eight contiguous beats of 8B might be employed. A 64B bucket size might be desirably employed. In described embodiments, each hash key 312 might be implemented as a 64-bit key to provide sufficient resolution for random hash patterns. Each value 314 might be implemented as a 54-bit value to allow up to 4 entries in each 64B bucket 308.

Figure 6:
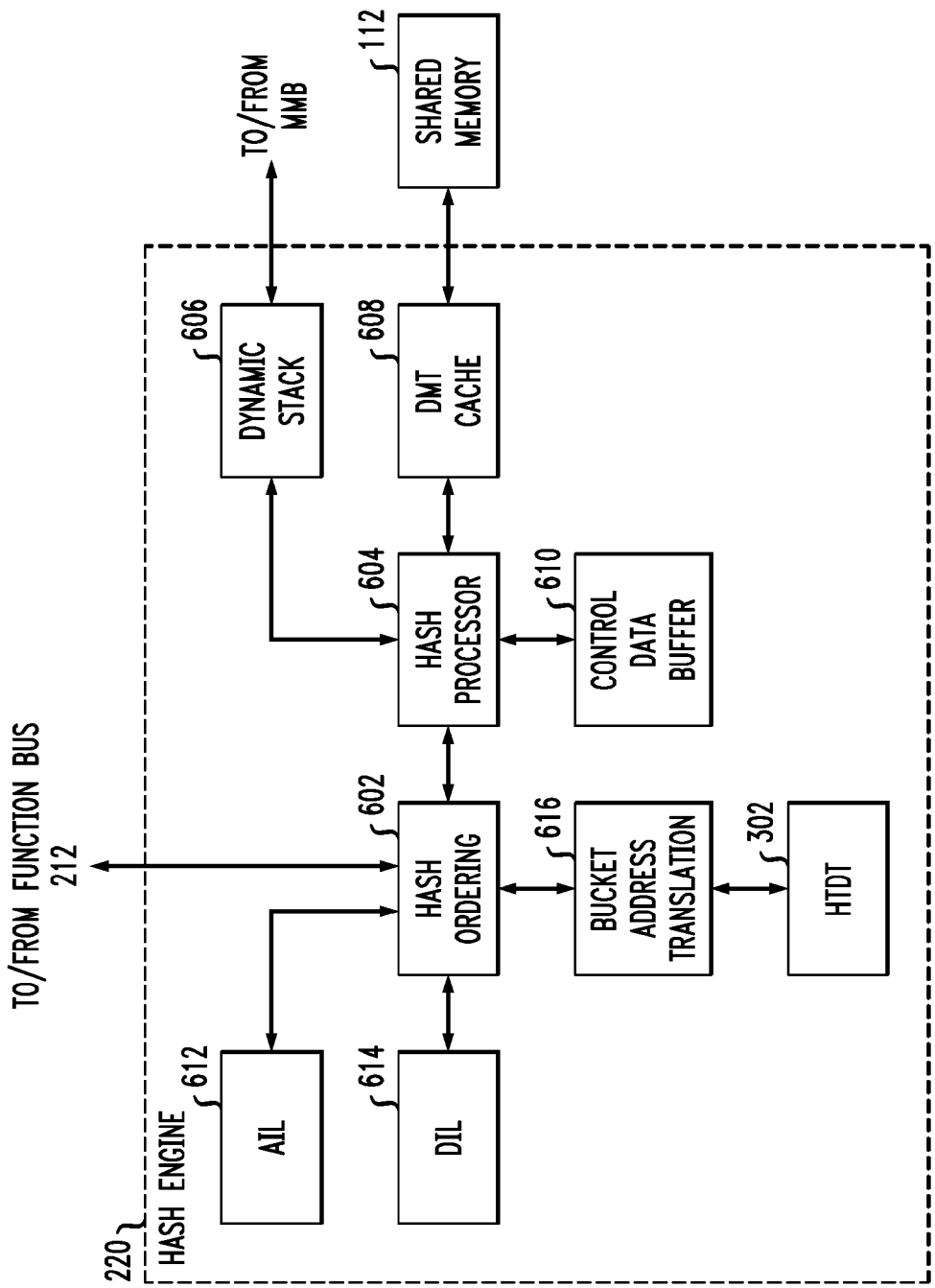
FIG. 6 shows a block diagram of a hash engine of the modular packet processor of FIG. 2.

Operation requests arrive at HE 220 via function bus 212 from other processing modules of network processor 100. FIG. 6 shows a block diagram of HE 220. As shown in FIG. 6, hash operation requests from function bus 212 are received hash ordering module 602. As described herein, each operation request to HE 220 might include a table ID value indicating the hash table associated with the operation request. The table ID value is an index to HTDT 302 to retrieve the base address (table index) for accesses to the hash table corresponding to the received table ID. The table index might be extracted from the hash operation request by bucket address translation module 616. Hash ordering module 602 obtains the table index from HTDT 302 and provides the table index and a hash key to hash processor 604. Hash ordering module 602 also maintains ordering of operation requests corresponding to the same table ID. Hash ordering module 602 might also arbitrate access to hash processor 604 between operation requests for different table ID values.

Hash processor 604 receives operation requests from hash ordering module 602. For each clock cycle, hash processor 604 either starts processing a received operation request or continues processing a previously received operation request. When hash processor 604 completes an operation, hash processor 604 returns data to hash ordering module 602 and function bus 212. Dynamic stack module 606 interfaces with the MMB of network processor 100 and hash processor 604. Dynamic stack module 606 might receive requests from hash processor 604 for a new bucket to be allocated for a particular hash table. Dynamic stack module 606 might provide hash processor 604 with an address to a memory block from the stack. Dynamic stack module 606 might "pre-request" one or more memory block addresses from the MMB to maintain the stack at a predetermined threshold, such as ¾ filled. If the stack is more than ¾ full, dynamic stack module 606 might release one or more memory block addresses back to the MMB for re-allocation to other modules of network processor 100.

A given hash table might change in size as entries are added or deleted in the hash table. When entries are deleted from the hash table, HE 220 removes invalid entries ("holes") starting from the head of the search linked list. By removing invalid entries, HE 220 reduces the memory required for a given hash table, which correspondingly reduces search time of the hash table. To remove an invalid entry, HE 220 might move the last entry in the last bucket in the search linked list to the invalid entry's place. If there are no more valid entries in the last bucket, then the preceding bucket's link target valid indicator is cleared and, if the last bucket is a dynamically allocated bucket, the memory block containing the bucket might be returned to the MMB.

When a hash table requires an additional bucket, HE 220 checks the current last bucket of the search list. If the link valid indicator is set, and the link target valid indicator is not set, a next bucket is already allocated but has not yet been written with data. The next bucket is then linked into the search list and written with data and key information. If the link valid indicator is not set, HE 220 requests a new memory block from dynamic stack module 606, which has one or more memory blocks allocated from the MMB. Thus, a search linked list can be extended by allowing binding of dynamically allocated buckets to a given hash table search linked list. As described herein, a dynamically allocated memory block might be the same size as the system cache line, which in some embodiments is 256B and might hold up to four buckets. HE 220 might track the total number of dynamic memory blocks that have been allocated. HE 220 might allow up to a maximum threshold number of dynamic memory blocks to be allocated to a given hash table.

Figure 4:
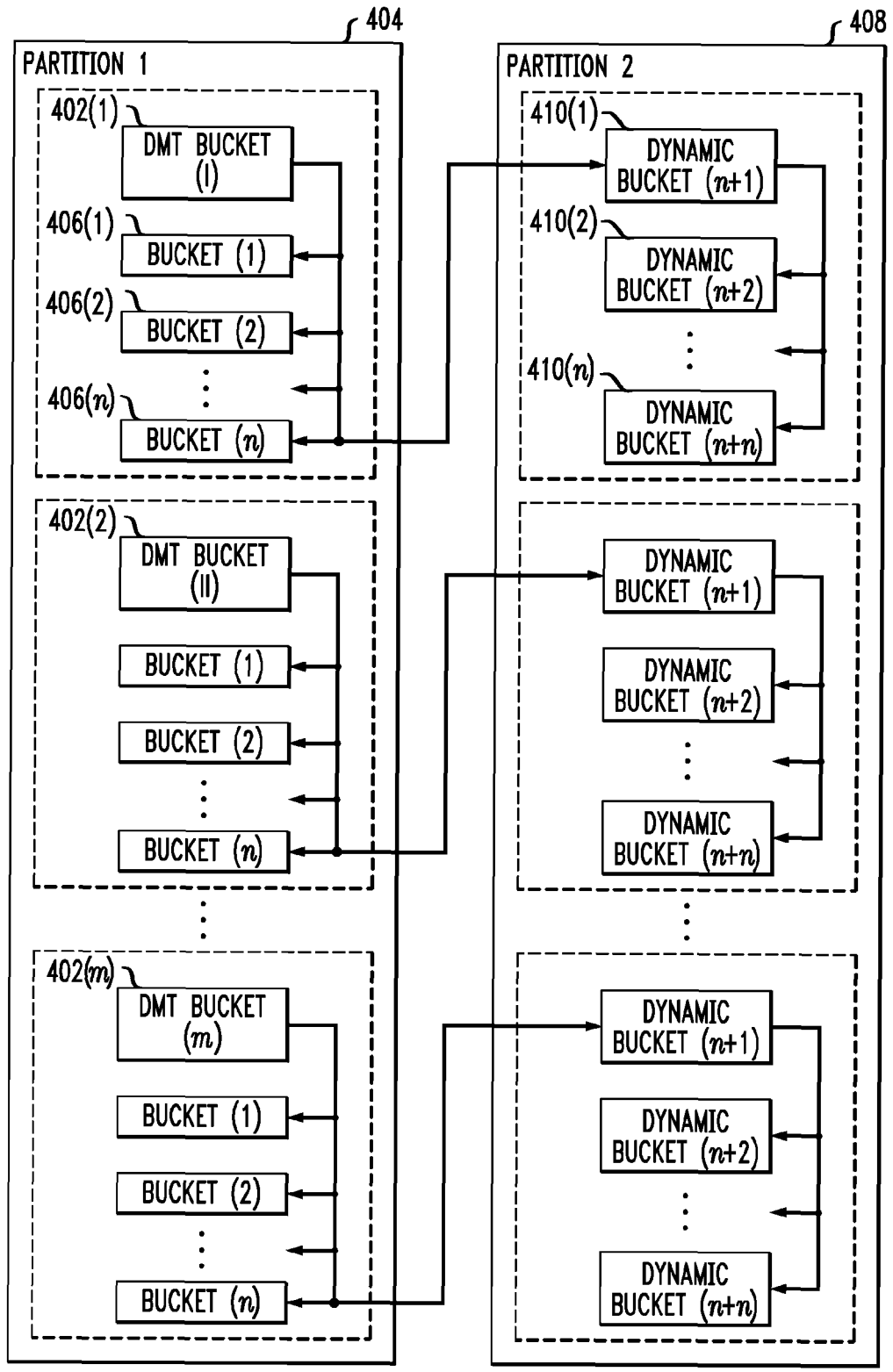
FIG. 4 shows an exemplary block diagram of various data structures of a hash engine of the modular packet processor of FIG. 2.

FIG. 4 shows a block diagram of an exemplary bucket allocation employed by HE 220. As shown in FIG. 4, one or more statically allocated DMT buckets, shown as DMT buckets 402(1)-402(m), might be located in a single memory segment, shown as partition 404. As described, each DMT bucket 402(1)-402(m) might typically correspond to a hash table. As shown in FIG. 4, each DMT bucket 402(1)-402(m) might also include one or more additional buckets that are contiguous to each DMT bucket 402(1)-402(m). Additional buckets 406(1)-406(n) might be statically allocated to each hash table. Thus, as shown in FIG. 4, some described embodiments might provide that all statically allocated buckets are stored, contiguously, in an independent memory partition. Dynamically allocated buckets might be stored in one or more additional memory partitions, shown as partition 408. Multiple dynamically allocated buckets, shown as dynamic buckets 410(1)-410(n), corresponding to the same hash table might be stored contiguously. Memory partitions might be implemented as blocks of memory having 256B entry lines to correspond to a 256B cache line of network processor 100.

Figure 5:
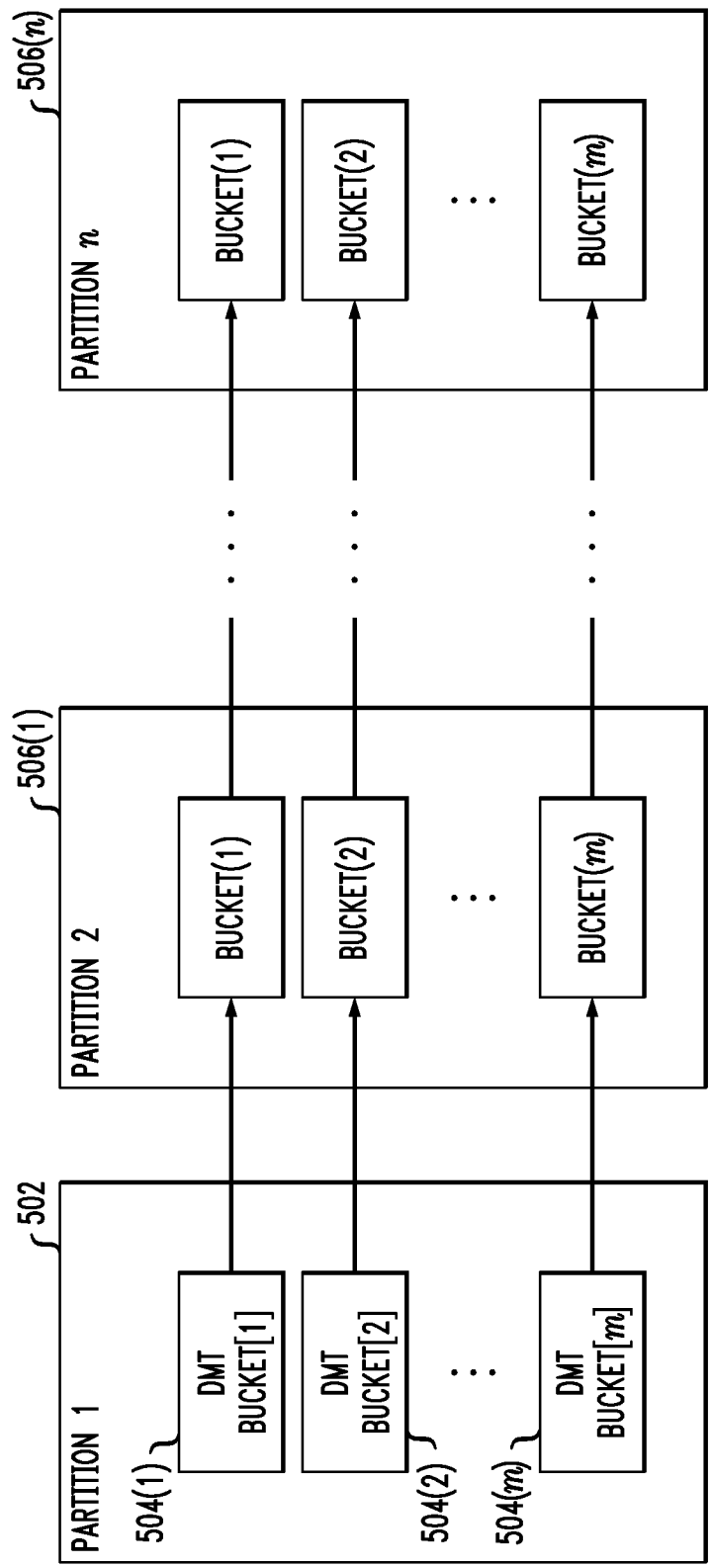
FIG. 5 shows an exemplary block diagram of various data structures of a hash engine of the modular packet processor of FIG. 2.

FIG. 5 shows a block diagram of an alternative bucket allocation employed by HE 220. As shown in FIG. 5, first memory partition 502 might include the first bucket for each hash table, shown as DMT buckets 504(1)-504(m). Subsequent statically allocated blocks might each be in separate memory partitions, shown as partitions 506(1)-506(n).

As shown in FIG. 3, each bucket might contain link 316 to a next bucket in the search linked list. As described, link 316 might include one or more indicators, such as link valid indicator and link target valid indicator. On initial configuration of a hash table, the link valid indicator might be set for each statically allocated bucket for a given hash table that has another statically allocated bucket after it in the search linked list. For example, referring to FIG. 4, buckets 402(1) and 406(1)-406(n−1) have their corresponding link valid indicators set, indicating that there is a valid bucket at the memory location corresponding to link 316. The link valid indicator for bucket 406(n) is not set since, at initial configuration of the hash table, no bucket follows bucket 406(n).

Hash operations are implemented by a mapping function through which a large number of keys is mapped to a smaller number of indices. As described herein, hash tables are addressed by a Table ID value that is a typically a parameter of a hash operation request, further, an entry within the hash table is addressed by an index value. As shown in FIG. 3, entries of the hash tables are in the form of a {Key, Value} pair. When a hash operation request is received by HE 220, HE 220 determines a key value associated with the operation request. Keys are mapped to an index value by uniform hashing functions. In choosing a uniform hashing function, an attempt is made to uniformly distribute function keys among indices. However, since the number of indices is typically smaller than the number of keys, "aliasing" occurs. As shown below, $FN_{key(j)}$ denotes the key associated with the jth hash operation request. In the exemplary hash mappings shown below, keys zero through L are mapped (aliased) to the same index value, $FN_{index(M)}$ and U_H represents the uniform hashing function. Hence, as shown below, more than one key might be mapped to a particular index, as shown in relation (1):

$$U\_H\{FN_{key(0)} \leftrightarrow FN_{index(M)}\}$$

$$U\_H\{FN_{key(1)} \leftrightarrow FN_{index(M)}\}$$

$$\ldots$$

$$U\_H\{FN_{key(L)} \leftrightarrow FN_{index(M)}\} \quad (1)$$

In general, hash operations access a hash table using the key and associated index. When the function call is completed, a status and a value might be returned to the processing module of network processor 100 that requested the hash operation. Hash operations can be table-modifying operations such as insert and delete, or non-table-modifying operations such as lookup. Insert operation requests are received by HE 220 and include the key value and the value to be written to the hash table (e.g., key 312 and value 314). The status returned indicates the result of the hash operation, for example, fail, success, etc. If the key value already exists in the hash table, the value is not entered and a failure condition might be indicated (e.g., {match, failure}). Delete operation requests result in the removal of the key and value pair from the hash table at the key value matching the key received with the delete operation request (e.g., $HT_{key}$ matches $FN_{key}$). The status returned indicates the result of the hash operation, for example, fail, success, etc. If there is no matching key in the hash table for $FN_{key}$, a failure condition might be indicated (e.g., {match, failure}). Lookup operation requests return the value stored in the hash table at the corresponding index value (e.g., $HT_{value}$ when $FN_{key}$ matches $HT_{key}$).

During hash processing, if more hash entries are mapped to a particular DMT bucket, HE 220 allocates a dynamic block and sets the link value to the memory location of a first dynamic bucket in the newly allocated dynamic block (e.g., bucket 410(1)) and sets the link valid indicator of bucket 406(n) to indicate that there is a bucket after bucket 406(n). Once a hash entry (e.g., key 312 and value 314) is written to dynamic bucket 410(1), the link target valid indicator of bucket 406(n) is set to indicate that there is valid data in the bucket after bucket 406(n) (e.g., dynamic bucket 410(1) contains valid data). In described embodiments, up to 16 hash keys might be mapped to one table index.

During a hash table search, HE 220 determines whether the key received in a hash operation request matches a key from the hash table designated for the hash operation request by HTDT 302 based on the table ID. In described embodiments, the table ID value might be 10-bits, allowing up to 1024 hash tables, each having a corresponding entry in HTDT 302. HTDT 302 might further employ one or more additional control fields in the table info field shown in hash entry 304. For example, the additional control fields might include a valid indicator to indicate whether the hash table corresponding to the table ID value is currently allocated, a table size value that indicates the size of the statically allocated memory for the hash table, the base memory address of the statically allocated memory for the hash table, a current number of dynamically allocated memory blocks allocated to the hash table, and a maximum threshold of dynamically allocated memory blocks allowed for the hash table. The table valid indicator might be set when a hash table corresponding to the table ID is allocated, and might beneficially allow for hash tables to be added or deleted in the background while HE 220 is processing other traffic. HE 220 might store control data for each outstanding operation in control data buffer 610 as shown in FIG. 6.

When HE 220 receives a hash operation request, HE 220 searches the corresponding hash table to determine whether an entry exists in the hash table having a matching key value. HE 220 might first compute an address for the hash table location in shared memory 112, and then retrieve the hash table data for temporary storage in a cache of HE 220. In some embodiments, the hash table address in shared memory 112 might be calculated based on the table ID value included in the hash operation request, the base memory address stored in HTDT 302, and an index offset value.

Software running on one of µP cores 106 might modify one or more of the control values stored in HTDT 302, for example to statically allocate one or more spare buckets adjacent to the DMT entry for a given hash table, such as shown in FIG. 4, to modify a maximum threshold size of a hash table, or to update the number of dynamically allocated memory blocks for a hash table.

If an insert operation request is for a hash table not having any entries available, HE 220 requests a new dynamic memory block for the hash table, for example, from the MMB. In a first write operation the new entry is inserted to an entry in a bucket of the new dynamic block and the address of the new bucket is stored in link field 316 of the previous bucket in the hash table linked list. HE 220 might update other control information in the previous bucket, such as the link valid indicator and the link target valid indictor. Once all entries of a first bucket in the dynamic block are occupied, HE 220 might allocate a second bucket out of the dynamic block, in the manner described above. Once all buckets in the dynamic block are filled, HE 220 requests another dynamic block and the process repeats.

Embodiments of the present invention provide an algorithm for real-time processing of hash entry delete operations. As described, a hash table might include one or more buckets, each bucket including one or more hash entries. A hash entry delete operation removes an entry having a key matching the requested key from a hash table bucket. Unless the deleted entry is the last entry of a search linked list, removing the entry results in an empty location within the search linked list. As described, HE 220 removes the deleted entry and inserts an entry in the empty location in the search linked list. HE 220 might employ one or more state registers to maintain link-addresses for transfers needed to fill the empty location.

HE 220 might typically maintain hash table control data in local buffer 610 of HE 220, as shown in FIG. 6. For example, HE 220 might maintain the address of the current bucket of the hash table that is read into the local cache. This current address might correspond to the bucket that is just read by HE 220. HE 220 might also maintain the address of a previous bucket in the hash table linked list. The previous bucket address might be employed if a delete operation results in removal of a bucket from the end of the hash table linked list. When the last bucket is removed, the link value of the previous bucket is modified by a write operation by using the previous bucket address. HE 220 might maintain an address of the bucket containing an entry to be deleted and the specific entry location within the bucket to be deleted. As described herein, when the deleted entry is not at the end of the hash table linked list, the last entry of the hash table linked list is written to the location of deleted entry as indicated by the deleted bucket address and deleted entry location.

HE 220 might enforce a strict order of insertion of entries into each hash table such that the hash linked list is contiguous and has no empty locations. For example, if a hash bucket has N entries, and 3 entries are inserted in the bucket, entries 1-3 are filled first, and entries 4-N remain empty. When an entry is deleted, depending upon the location of the deleted entry in the hash table linked-list, the delete operation could require between one and three operations. If the deleted entry is the only valid entry in the last bucket of the linked-list, only one operation is performed. In this operation, when the deleted entry is the only valid entry in the last bucket of a list, the bucket is removed from the search linked list by clearing the link valid indicator of the previous bucket. The removed bucket might be made available to be reallocated for other hash operations.

If the deleted entry is in the last bucket of the search list, but is not the last entry in the list, two operations are performed. In the first operation, when the deleted entry is in the last bucket of the list, but it is not last entry of the list, the last valid entry of the search list (e.g., the last entry of the last bucket) is moved to the location of deleted entry. In the second operation, a valid indicator associated with the deleted entry is cleared.

If the deleted entry is not in the last bucket of the linked-list, two or three operations might be performed, depending on the number of entries in the last bucket of the linked-list. In a first write operation, the last entry of the hash table is moved to the location of the deleted entry. In a second write operation, the valid entry indicator of the last entry is reset. If the last bucket has more than one valid entry, the delete operation is complete. If the last bucket had only one entry, a third write operation clears the link target valid entry of the previous bucket in the hash table linked list, and removes the last bucket from the hash table.

If a received hash operation request is an insert operation, the operation request includes a value to be written to value field 314 of a first hash bucket having an available entry of the corresponding hash table. HE 220 reads the DMT entry corresponding to the table ID for the operation request to determine if the bucket is full. If the first bucket of the hash table is full, HE 220 reads the link target valid indicator to determine whether the bucket that link 316 points to includes valid entries. If the link target valid indicator is set, HE 220 reads the bucket corresponding to link 316, and processes this bucket as described above. Processing continues until a bucket with an available entry is found, or the link target valid indicator is not set, and a new bucket is allocated. HE 220 inserts the entry of the received operation in either the first available entry of the current bucket, or, if a new bucket is allocated, to the first entry location of the new bucket. When the entry is inserted, status returned indicates success. When reading a bucket to find an available entry, HE 220 also determines if a key matching the key for the requested insert operation exists in the hash table. If a matching key already exists in the hash table, the insert operation might return with an error status.

To perform a delete operation, HE 220 reads the first bucket of the hash table corresponding to the table ID for the delete operation request. If the first bucket of the hash table does not contain a key matching the key provided in the delete operation request, HE 220 reads the bucket pointed to by link 316. The search continues in this manner until either a matching key is found, or the end of the hash table linked list is reached. If the end of the list is reached and a matching key is not found, the delete operation might return with an error status. When a matching key is found, the bucket entry with the matching key is referred to as the "deleted entry".

If the deleted entry is the last valid entry of the last bucket of the hash table linked list, but the deleted entry is not the only entry in the bucket, the entry is deleted by performing one write to memory to clear control data corresponding to the deleted bucket, for example a valid entry indicator. Since the bucket is not removed from the hash table linked list, the value of link 316 of the previous bucket is not modified. If the deleted entry is not the last valid entry of the hash table linked list, the last entry is moved into the location of the deleted entry by performing a first write operation to transfer the last entry of the hash table to the location of the deleted entry. A second write operation resets, for example, a valid entry indicator of the last entry. If the last bucket has more than one entry, the delete operation is complete. If the last bucket had only one entry, a third write operation clears the link target valid entry of the previous bucket in the hash table linked list, and removes the last bucket from the hash table.

In embodiments of the present invention, HE 220 might concurrently perform multiple hash operations. Operations for the same hash table (e.g., table ID) might be performed such that table-modifying operations, such as insert and delete, are performed coherently while non-table-modifying operations, such as lookup, are performed concurrently but are not required to be coherent. Thus, as described herein, a coherent hash operation requires that a subsequent table-modifying hash operation for a given hash table cannot be processed until any prior hash operations for that table are completed. However, a subsequent non-table-modifying operation could be processed once any prior table-modifying operations are completed. HE 220 might allow burst processing of non-table-modifying operations for the same hash table, and might employ a deferring mechanism to allow for coherent operations to be deferred.

In embodiments of the present invention, HE 220 might concurrently receive multiple hash operation requests on separate threads of execution without a requirement of receiving the returns associated with each hash operation. If concurrent operation requests use the same key and index, coherency of processing required. If concurrent operation requests use different keys but alias to the same index, ordered processing is required since, even with distinct keys, the same hash table is processed. Further, operation requests desirably finish execution in the temporal order the operation requests are received by HE 220.

Embodiments of the present invention might include Active Index List (AIL) 612 and a Deferred Index List (DIL) 614. A table ID value might be added to AIL 612 when HE 220 begins processing a hash operation on the corresponding hash table. A table ID value might be removed from AIL 612 when HE 220 finishes all operations for the table ID. AIL 612 might track a number of deferred operations and at least one pointer to a corresponding deferred operation in DIL 614. For example, AIL 612 might include a head pointer and a tail pointer defining a linked-list of deferred jobs in DIL 614. AIL 612 might also track a number of lookup operations that are currently being processed for each active hash table ID.

Figure 8:
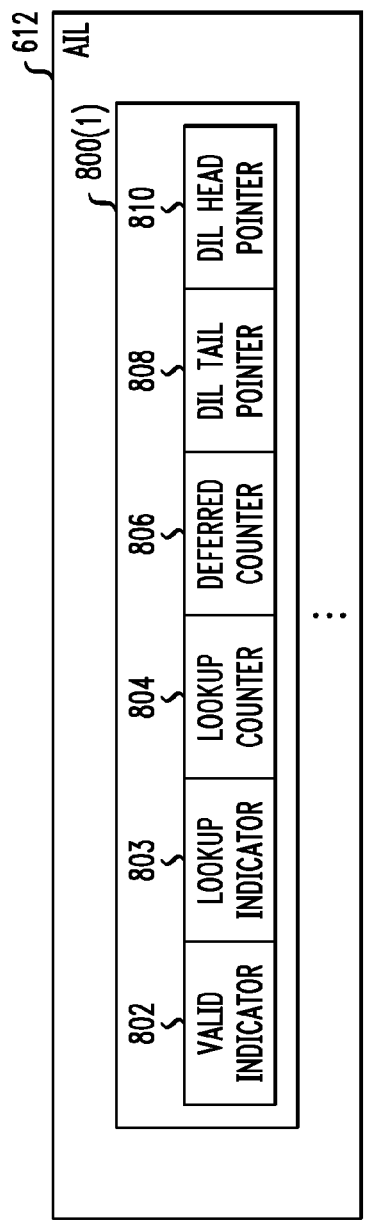
FIG. 8 shows an exemplary block diagram of a hash table data structure of a hash engine of the modular packet processor of FIG. 2.

FIG. 8 shows an exemplary data structure for AIL 612. As shown in FIG. 8, AIL 612 might include one or more entries 800(1), with one entry for each table ID having one or more active hash operations. AIL 612 might be indexed by table ID. As shown in FIG. 8, each entry in AIL 612 might include valid indicator 802, lookup counter 804, deferred operation counter 806, DIL tail pointer 808 and DIL head pointer 810. In some embodiments, AIL 612 might support 1024 entries, where each entry 800 in AIL 612 is 24-bits, valid indicator 802 is a 1-bit flag, lookup indicator 803 is a 1-bit flag, lookup counter 804 is a 6-bit value, deferred operation counter 806 is a 6-bit value, DIL tail pointer 808 is a 5-bit number and DIL head pointer 810 is a 5-bit number. Valid indicator 802 might be set when entry 800 contains valid data for one or more hash operations for the corresponding hash table. Lookup indicator 803 might be set if any of the active operations for the corresponding hash table are non-table-modifying operations, such as lookup operations. Lookup counter 804 tracks the number of active non-table-modifying operations for the corresponding hash table, and deferred operation counter 806 tracks the number of deferred operations in DIL 614 for the corresponding hash table.

DIL 614 contains multiple linked lists of deferred operations for each table ID having at least one deferred operation. Each linked list of deferred operations is a sequence of contexts representing operations that are deferred for a given hash table. New contexts are written into DIL 614 at the location pointed to by the tail pointer maintained in AIL 612. When a new context is written, the tail pointer in AIL 612 is updated to point to the next entry location. Contexts are read out of a given linked list of DIL 614 from the location pointed to by the head pointer stored in AIL 612. When a context is read, the head pointer is adjusted to point to the next context. DIL 614 might also include an indication whether a deferred context corresponds to a non-table-modifying operation such as a lookup. These indicators might be employed to allow HE 220 to dispatch consecutive lookup operations in a single burst.

Figure 9:
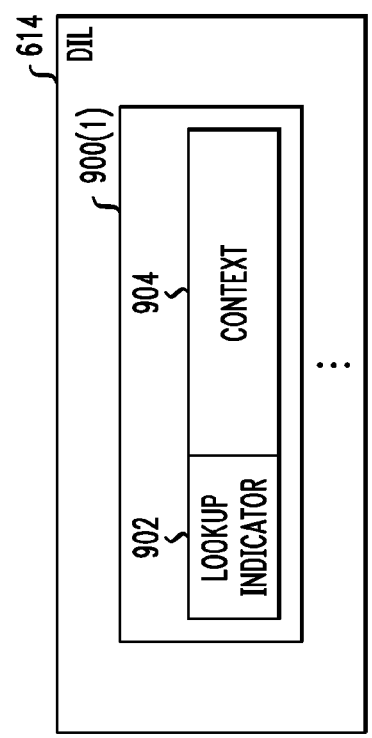
FIG. 9 shows an exemplary block diagram of a hash table data structure of a hash engine of the modular packet processor of FIG. 2.

FIG. 9 shows an exemplary data structure for DIL 614. As shown in FIG. 9, AIL 614 might include one or more entries 900(1), with one entry for each table ID having one or more deferred operations. Each entry in DIL 614 might include lookup indicator 902 and link 904. In some embodiments, DIL 614 might support up to N entries, for example, up to 32 entries. Each entry 900 in DIL 614 might be 6-bits, where lookup indicator 902 is a 1-bit flag and context 904 is 5-bits. Lookup indicator 902 might be employed by hash ordering module 602 to determine whether one or more deferred hash operations for a given hash table are non-table-modifying operations that can be grouped into a single burst. Context 904 might point to the context for the deferred hash operation, and link 906 might point to the next entry in DIL 614 that corresponds to the same hash table as entry 900(1).

As shown in FIG. 6, hash ordering module 602 enforces coherency and ordering requirements for hash operation requests aliased to the same index. For example, if a table-modifying hash operation request is received by HE 220 before prior operations for the same index are completed, hash ordering module 602 defers the table-modifying operation until the processing of the prior operations is complete. If a sequence of non-table-modifying operations for the same index arrive consecutively, hash ordering module 602 sends out the non-table-modifying operations in a burst, without deferring the operations.

Figure 10:
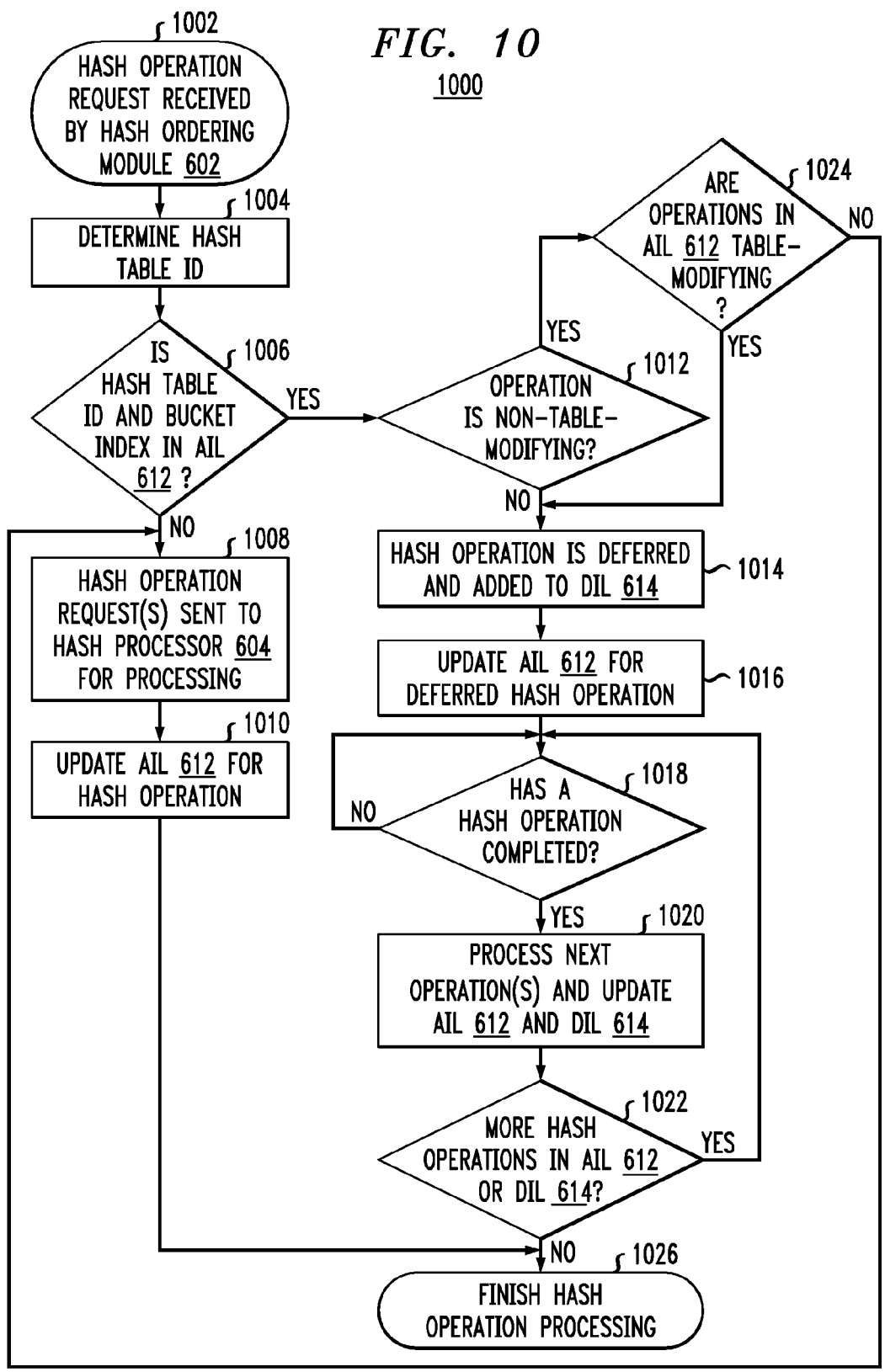
FIG. 10 shows an exemplary flow diagram of hash processing of a hash engine of the modular packet processor of FIG. 2.

FIG. 10 shows an exemplary flow diagram of hash process 1000 of hash engine 220. As described herein, hash operation requests might be generated by one of μP cores 106 or accelerators 108 of network processor 100. At step 1002, hash operation requests are received by hash ordering module 602 from function bus 212. For distinct contexts, hash ordering module 602 might provide hash operation requests to hash processor 604 without waiting for prior hash operations to complete processing by hash processor 604. At step 1004, hash ordering module 602 determines the hash table ID of the received hash operation request. At step 1006, hash ordering module 602 might determine whether one or more of the contexts is accessing a hash table and specific bucket that is being accessed by a current hash operation, and might defer a hash operation request if the hash table bucket is currently in use. As hash processor 604 completes each hash operation, hash processor 604 provides a status update to hash ordering module 602, which then updates AIL 612 and determines whether one or more deferred hash operation requests from DIL 614 can be sent to hash processor 604.

As described herein, at step 1006, if the hash table corresponding to a hash operation request does not have any prior table-modifying operations in progress or deferred, at step 1008 non-table-modifying operations are provided to hash processor 604 in bursts of one or more operations without deferral, while table-modifying operations might be provided individually. As described herein, typical table-modifying operations might include insert operations to insert one or more entries to a hash table, delete operations to remove one or more entries from a hash table, or other table-modifying operations such as table compaction, moving entries between locations, or modifying a value for a given entry. As described herein, non-table-modifying operations might include lookup or search operations. If the hash table corresponding to a hash operation request hash one or more prior table-modifying operations in progress or deferred, both table-modifying and non-table-modifying operations are deferred until prior operations are completed. Once prior operations are completed, non-table-modifying operations are provided to hash processor 604 in bursts of one or more operations without deferral, while table-modifying operations might be provided individually.

In described embodiments, when a hash operation request is received, at step 1006 hash ordering module 602 checks whether the requested hash table of the received hash operation request is listed in AIL 612. If the hash table is not listed in AIL 612, hash ordering module provides the received hash operation request to hash processor 604 for immediate processing at step 1008. If the received hash operation request is a non-table-modifying operation, and there are no deferred operations for the requested hash table in DIL 614, at step 1010 hash ordering module 612 might update a counter tracking the number of non-table-modifying operation for each hash table, and this value might be stored in AIL 612.

If the hash table is listed in AIL 612, the hash table has one or more active hash operations in progress. If, at step 1012, the received hash operation request corresponds to a table-modifying operation, such as an insert operation or a delete operation, at step 1014 the received hash operation is deferred and hash ordering module 602 adds the context corresponding to the received hash operation to DIL 614. At step 1016, hash ordering module 602 might also update a counter tracking the number of deferred operations for each hash table, and this value might be stored in AIL 612. In some embodiments, for the first deferred operation, DIL 614 is not updated; rather, AIL 612 is updated such that the deferred operation counter is incremented to one and a pointer for the single deferred operation is written to AIL 612, for example, in the location that points to the head of DIL 614. Similarly, if operations are already deferred, some embodiments might update both AIL 612 and DIL 614. For example, DIL 614 is updated to include the newly received hash operation request, and AIL 612 is updated to point to the head of DIL 614 if it does not already do so, and AIL 612 is also be updated to point the tail of DIL 614, which is the context for the newly received hash operation request. The deferred operation counter is incremented and updated in AIL 612.

If the hash table is listed in AIL 612, the hash table has one or more active hash operations in progress. If, at step 1012, the received hash operation request corresponds to a non-table-modifying operation, and at step 1024 there are one or more deferred operations for the hash table (e.g., one or more prior operations are table-modifying), the newly received operation request is deferred at step 1014. Hash ordering module 602 adds the received hash operation request to the tail of DIL 614. At step 1016, the counter tracking the number of non-table-modifying operations is not incremented until the operation is provided to hash processor 604 for processing. AIL 612 is updated to point to the current tail of DIL 614.

For example, if the non-table-modifying operation counter is zero, there are no presently active non-table-modifying operations in hash processor 604. If the deferred operation counter is greater than zero, at least one operation will be sent to hash processor 604 from DIL 614 by hash ordering module 602. Hash ordering module 602 provides hash processor 604 with the hash operation request at the head of DIL 614 and the non-table-modifying operation counter is incremented. If new non-table-modifying operations for the same hash table and bucket index are received before this non-table-modifying operation completes, hash ordering module 602 might provide them to hash processor 604 for processing in a burst without being added to DIL 614. Further, hash ordering module 602 might group one or more deferred non-table-modifying operations in DIL 614 to be provided to hash processor 604 for processing if non-table-modifying operation counter is greater than zero and more than one non-table-modifying operation is deferred in DIL 614 for a given hash table.

At step 1018, as a hash operation completes processing by hash processor 604, hash ordering module 602 might determine at step 1020 whether to provide one or more deferred hash operations for the corresponding hash table to hash processor 604 for processing. For example, if at least one of lookup indicators 803 and 902 are set, hash ordering module might determine that a burst of one or more non-table-modifying hash operations can be grouped into a single burst for the corresponding hash table. At step 1022 if more hash operations are active or deferred, process 1000 remains at step 1018 until a hash operation completes. If the received hash operation request corresponds to a non-table-modifying operation, and there are no deferred operations for the hash table, hash ordering module 602 provides the hash operation request to hash processor 604 for processing and increments the counter tracking the number of non-table-modifying operations. At step 1026, once there are no more active or deferred hash operations, hash processing is complete.

Thus, as described herein, embodiments of the present invention provide a hash processor for a system having multiple processing modules and a shared memory. The hash processor includes a descriptor table with N entries, each entry corresponding to a hash table of the hash processor. A direct mapped table in the shared memory includes at least one memory block including N hash buckets. The direct mapped table includes a predetermined number of hash buckets for each hash table. Each hash bucket includes one or more hash key and value pairs, and a link value. Memory blocks in the shared memory include dynamic hash buckets available for allocation to a hash table. A dynamic hash bucket is allocated to a hash table when the hash buckets in the direct mapped table are filled beyond a threshold. The link value in the hash bucket is set to the address of the dynamic hash bucket allocated to the hash table.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A hash processor for a system having a plurality of processing modules, the hash processor coupled to at least one shared memory, the hash processor comprising:
   a hash table descriptor table comprising N entries, each entry corresponding to a hash table of the hash processor, where N is a positive integer;
   a direct mapped table in the at least one shared memory, the direct mapped table comprising at least one memory block including M entries, where M is a positive integer, each entry comprising a hash bucket, wherein the direct mapped table is configured to allocate a predetermined number of hash buckets to each hash table;
   each hash bucket comprising (i) one or more entries, each entry comprising a hash key and value pair, and (ii) a link value;
   a pool of memory blocks in the at least one shared memory, the memory blocks comprising one or more dynamic hash buckets available for allocation to a corresponding hash table;
   wherein the hash processor is configured to allocate a dynamic hash bucket from the one or more dynamic hash buckets available for allocation, the dynamic hash bucket allocated to a given hash table when the number of entries in one or more hash buckets in the direct mapped table corresponding to the given hash table are filled beyond a threshold, and wherein the link value in the corresponding hash bucket in the direct mapped table is set to an address of the dynamic hash bucket allocated to the given hash table.

2. The hash processor of claim 1, wherein the hash processor is configured to statically allocate at least one bucket in the direct mapped table to each hash table.

3. The hash processor of claim 1, wherein each dynamically allocated bucket comprises (i) one or more entries, each entry comprising a hash key and value pair, and (ii) a link value, and wherein the link value comprises an address of a next dynamic hash bucket allocated to the corresponding hash table.

4. The hash processor of claim 3, wherein the link value further comprises:
   a link valid indicator configured to indicate whether the link value corresponds to an allocated bucket corresponding to the hash table; and
   a link target valid indicator configured to indicate whether that valid data is stored in the bucket corresponding to the link value.

5. The hash processor of claim 4 wherein each hash bucket is 64 bytes, each entry comprises an 8 byte hash key and a 7 byte value, the link pointer is a 30 bit value, the link valid indicator is a 1 bit value and the link target valid indicator is a 1 bit value.

6. The hash processor of claim 5, wherein each hash table bucket comprises four entries.

7. The hash processor of claim 1, wherein each entry of the hash table descriptor table comprises: a table ID value identifying the corresponding hash table, a table base value identifying an address in the at least one shared memory of a first bucket of the corresponding direct mapped table of the corresponding hash table, and a table size value indicating a size of the corresponding hash table.

8. The hash processor of claim 7, wherein each entry of the hash table descriptor table further comprises: a valid indicator configured to indicate that the corresponding hash table includes valid data, a number of dynamically allocated buckets corresponding to the hash table, and a maximum threshold of dynamically allocated buckets allowed for the corresponding hash table.

9. The hash processor of claim 1, wherein the hash processor is configured to generate a linked list corresponding to each hash table, the linked list comprising at least one bucket in the direct mapped table and zero or more dynamically allocated buckets.

10. The hash processor of claim 9, wherein the linked list corresponding to each hash table is configured based on the link value of each bucket in the hash table.

11. The hash processor of claim 1, wherein the hash processor is configured to store the one or more buckets in the direct mapped table for the given hash table in contiguous locations in at least one corresponding partition of the at least one shared memory.

12. The hash processor of claim 11, wherein the hash processor is configured to store the one or more dynamically allocated buckets for the given hash table in contiguous locations in at least one corresponding partition of the at least one shared memory.

13. The hash processor of claim 12, wherein the hash processor is configured to store a first bucket for each hash table in a first partition of the at least one shared memory, a second bucket for each hash table in a second partition of the at least one shared memory, and so forth until the last bucket of all the hash tables, wherein each successive bucket of each hash table is stored in a successive partition of the at least one shared memory.

14. The hash processor of claim 1, wherein N is equal to 1024.

15. The hash processor of claim 1, wherein the system is implemented in an integrated circuit.

16. A system for processing data packets received by a network processor from one or more source nodes of a network, the system comprising:
   a network processor comprising one or more microprocessors and one or more hardware accelerators;
   at least one shared memory, wherein the at least one shared memory is managed by a memory manager of the network processor, the memory manager configured to allocated one or more available memory blocks of the at least one shared memory to one or more requesting ones of the one or more microprocessors and the one or more hardware accelerators;
   a packet classifier configured to classify received data packets based on at least one of a traffic type corresponding to each received data packet and a flow identifier of each received data packet, wherein the packet classifier includes a hash processor configured to perform hash operations to classify incoming packets, the hash processor comprising:
      a hash table descriptor table comprising N entries, each entry corresponding to a hash table of the hash processor, where N is a positive integer;
      a direct mapped table in the at least one shared memory, the direct mapped table comprising at least one memory block including M entries, where M is a positive integer, each entry comprising a hash bucket, wherein the direct mapped table is configured to allocate a predetermined number of hash buckets to each hash table;
      each hash bucket comprising (i) one or more entries, each entry comprising a hash key and value pair, and (ii) a link value;
      a pool of memory blocks in the at least one shared memory allocated to the hash processor by the memory manager, the memory blocks comprising one or more dynamic hash buckets available for allocation to a corresponding hash table;
      wherein the hash processor is configured to allocate a dynamic hash bucket from the one or more dynamic hash buckets available for allocation, the dynamic hash bucket allocated to a given hash table when the number of entries in one or more hash buckets in the direct mapped table corresponding to the given hash table are filled beyond a threshold, and wherein the link value in the corresponding hash bucket in the direct mapped table is set to an address of the dynamic hash bucket allocated to the given hash table.

17. The system of claim 16, wherein the hash processor is configured to statically allocate at least one bucket in the direct mapped table to each hash table.

18. The system of claim 16, wherein each dynamically allocated bucket comprises:
   one or more entries, each entry comprising a hash key and value pair; and
   a link value, wherein the link value comprises (a) the address of a next dynamic hash bucket allocated to the corresponding hash table, (b) a link valid indicator configured to indicate whether the link value corresponds to an allocated bucket corresponding to the hash table, and (c) a link target valid indicator configured to indicate whether that valid data is stored in the bucket corresponding to the link value;

wherein each hash bucket is 64 bytes and comprises four entries, each entry comprising an 8 byte hash key and a 7 byte value, the link pointer is a 30 bit value, the link valid indicator is a 1 bit value and the link target valid indicator is a 1 bit value.

19. A method of organizing hash tables of a network processor having a plurality of processing modules and at least one shared memory, the method comprising:

maintaining, by a hash processor of the network processor, (i) a hash table descriptor table comprising N entries, each entry corresponding to a hash table of the hash processor, where N is a positive integer, (ii) a direct mapped table in the at least one shared memory, the direct mapped table comprising at least one memory block including M entries, where M is a positive integer, each entry comprising a hash bucket, wherein the direct mapped table is configured to allocate a predetermined number of hash buckets to each hash table, wherein each hash bucket comprises (a) one or more entries, each entry comprising a hash key and value pair, (b) a link value corresponding to the address of a next dynamic hash bucket allocated to the corresponding hash table, (c) a link valid indicator configured to indicate whether the link value corresponds to an allocated bucket corresponding to the hash table; and (d) a link target valid indicator configured to indicate whether that valid data is stored in the bucket corresponding to the link value;

statically allocating, by the hash processor, at least one bucket in the direct mapped table to each hash table;

determining, by the hash processor, whether a the number of entries in the one or more hash buckets in the direct mapped table are filled beyond a threshold;

if the threshold is reached:

dynamically allocating, by the hash processor, one or more dynamic hash buckets to a corresponding hash table, the one or more dynamic hash buckets in a memory block allocated from a pool of memory blocks in the at least one shared memory;

setting, by the hash processor, (1) the link value in the corresponding hash bucket in the direct mapped table to the address of the dynamic hash bucket allocated to the corresponding hash table, (2) the link valid indicator in the corresponding hash bucket in the direct mapped table to indicate a dynamic bucket is allocated, and (3) the link target valid indicator to indicate that the allocated dynamic bucket includes valid data.

20. The method of claim 19, wherein the method is implemented by a machine executing program code encoded on a non-transitory machine-readable storage medium.

* * * * *